Feb. 14, 1928.
E. H. HANSEN
HOSE RACK
Filed May 15, 1926
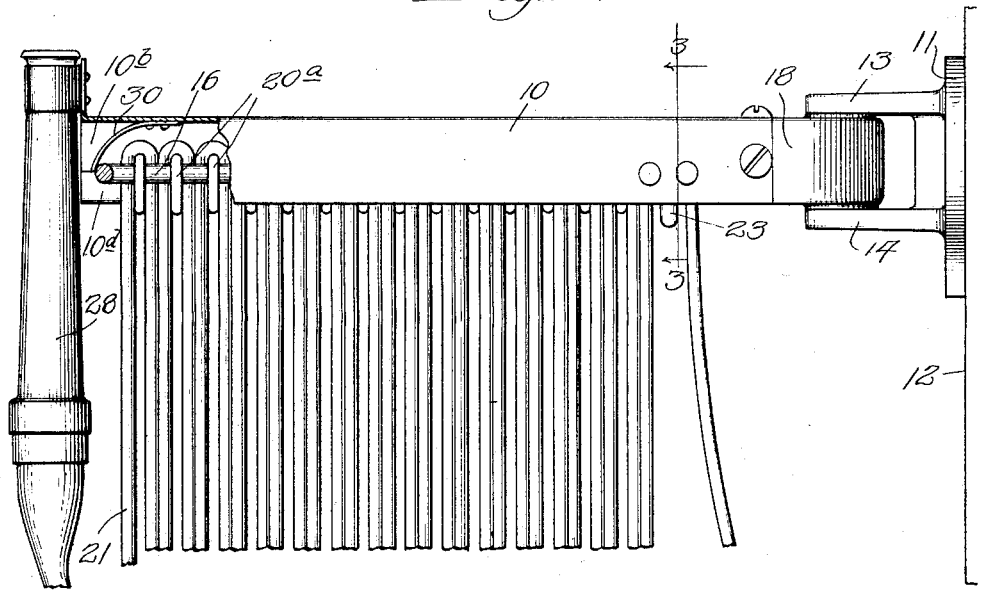
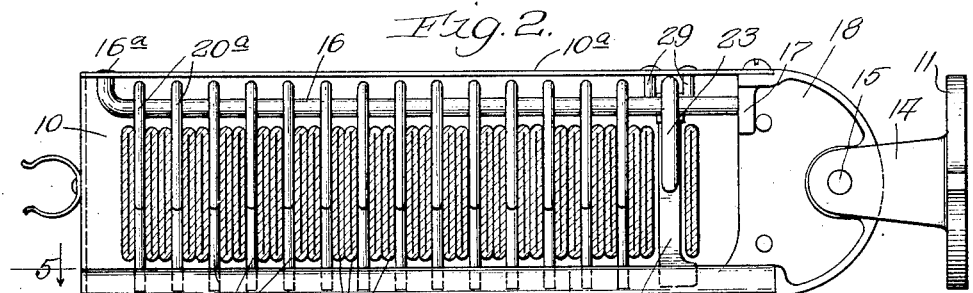
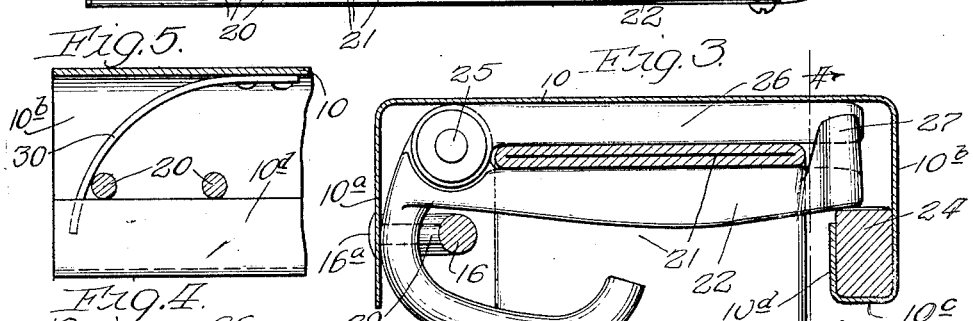
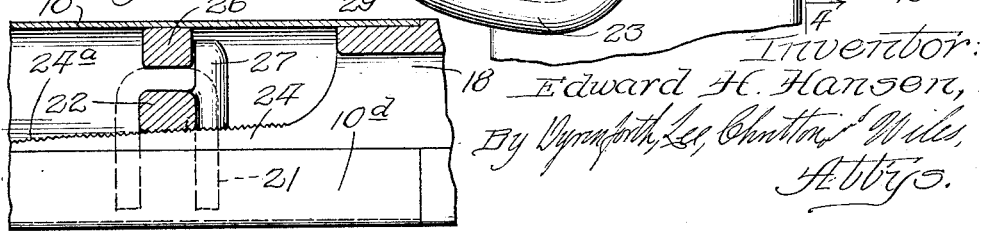

Patented Feb. 14, 1928.

1,658,793

UNITED STATES PATENT OFFICE.

EDWARD H. HANSEN, OF ELKHART, INDIANA, ASSIGNOR TO ELKHART BRASS MANUFACTURING COMPANY, A CORPORATION OF INDIANA.

HOSE RACK.

Application filed May 15, 1926. Serial No. 109,302.

This invention relates to hose racks and more especially to a hose rack primarily adapted for supporting fire hose. The rack is of the general type in which the hose is carried in folds or loops on a series of supports such as, for example, pins or cross bars. The supports are so arranged that upon pulling the end of the hose, the hose will be released and may be played out from the rack.

One of the features of my invention is the provision of means in connection with such a rack for clamping or gripping the hose at a point near the valve in order to prevent the flow of water through the hose in the event that the valve should be opened before the hose is removed from the rack. If it were not for such shut-off means, upon opening the water valve before removing the hose from the rack, the hose would be likely to fill with water throughout its length thus causing it to jam or lodge in the rack and prevent its easy removal therefrom. Also, if it were not for such shut-off means, and the valve should be opened before removing the hose from the rack, water would issue from the nozzle while the same is taken to the location of the fire and this would be likely to hamper the proper handling of the nozzle.

By the use of my invention, with the water shut off near the valve until the hose is removed from the rack, it will be seen that the objections just noted will be avoided. That is, the water may be turned on at the very beginning; and this will not cause any inconvenience in removing the hose from the rack. My shut-off is also so made that upon removing the last loop of hose from the rack the shut-off will be automatically opened, thus permitting the flow of water. It will be seen therefore that the water may be turned on at the very beginning, and the hose then pulled out from the rack by hauling on the nozzle. Upon the last loop of the hose leaving the rack, the hose then being ready for use, water will instantly flow.

My improved hose rack is strong and durable, simple in design and cheap to manufacture. It is also efficient and sure in operation.

Other features and advantages of my invention will appear more fully as I proceed with my specification.

In that form of the device embodying the features of my invention shown in the accompanying drawings,—

Figure 1 is a view in side elevation of my improved hose rack;

Figure 2 is a similar bottom plan view;

Figure 3 is a view taken as indicated by the line 3 of Fig. 1;

Figure 4 is a view taken as indicated by the line 4 of Fig. 3; and

Figure 5 is a view taken as indicated by the line 5 of Fig. 2.

As shown in the drawings, the hose rack comprises a suitable supporting arm or bracket 10 adapted to swing in a horizontal plane. This bracket may be supported in any suitable manner as, for example, by means of a plate 11 adapted to be secured to the wall 12, said plate 11 being provided with the upper and lower arms 13 and 14 respectively, carrying a pin 15 upon which the bracket 10 is pivoted.

The bracket 10 may conveniently be formed of sheet metal with its margins bent downwardly as indicated by $10^a$ and $10^b$, so that its cross-section is in the shape of an inverted U. The margin or edge $10^b$ at the bottom is bent inwardly and then upwardly a short distance as indicated by $10^c$ and $10^d$ respectively.

Arranged adjacent the inner side of the depending flange $10^a$ of the bracket is a supporting rod 16, having its outer end attached to the edge $10^a$ at $16^a$ and its inner end mounted in a suitable lug 17 formed on the casting 18, which carries the inner end of the bracket 10.

20, 20 indicate a series of pins constituting supports for the folds of the hose 21. These pins at one end are provided with elongated loops $20^a$ encircling the support 16, and the other ends of the hose supporting pins 20 rest upon the upper edge of the flange $10^d$.

The innermost support, that is, the one next to the valve, is of different construction. The automatic shut-off heretofore referred to is provided in connection with this innermost pin. I will now describe this construction in detail. This pin is shown in Fig. 3 as indicated by 22. It will be seen that this pin also has an elongated loop 23 surrounding the supporting bar 16. The other end of this pin or support, however, does not rest upon the upper edge of the margin 10ᵈ of the bracket 10, but lies upon the upper edge of a slanting or beveled cam member 24 held between the portions 10ᵇ, 10ᶜ and 10ᵈ of the bracket 10. It will be seen (Fig. 4) that the upper surface of this cam member 24 is beveled or slanted downwardly away from the inner end of the bracket 10 and its upper surface may be suitably roughened or milled as indicated by 24ᵃ in order to prevent too free sliding of the end of the pin 22 thereupon. The bottom surface of the end of the pin where in engagement of the upper surface of the cam 24 may be likewise milled or roughened in order to increase the frictional engagement between the parts. The end of the pin 22 adjacent the supporting rod 16 has pivoted thereto at 25, above it, a clamping bar 26, the upper surface of which is adapted to bear against the top of the bracket member 10. The end of the pin 22 adjacent the cam support 24 carries an upwardly projecting lug or tongue 27 to assist in holding the hose 21 on the pin 22.

The pin 22 and the clamping bar 26 are so made and proportioned that when a fold of the hose is placed over the support 22 and the end of this support pulled up on the cam surface 24, the clamping bar 26 will bear against the under surface of the bracket 10 causing the pin 22 and the clamping bar 26 to be brought together like the jaws of a pincher to pinch the hose 21 therebetween and shut off any flow of water at such point.

In the operation of the device, upon pulling the hose by the nozzle 28 it will be seen that the pins 20, 20 will have their free ends pulled off of the edge 10ᵈ, thus releasing one fold of the hose after the other, until the last supporting pin 22 remains. During this time the water will remain shut off at 22. Upon pulling the last fold, however, the end of the pin 22 is pulled down along the slanting surface 24ᵃ on the upper part of the cam 24 thus permitting a separation of the support 22 from the clamping bar 26 to permit flow of water. At substantially the same time, the end of the pin 22 swinging around in an arc, will fall off of the support 24 and thus release the last fold of the hose.

Between the bar 16 and the edge 10ᵃ of the bracket 10 are provided two pins 29, 29, one on each side of the loop 23 of the support 22, to prevent sliding movement of such loop along the supporting rod 16. The loop being thus held, when the fold of the hose over the pin 22 is pulled, the free end of the pin 22 describes an arc, thus releasing it from the supporting surface 24.

At the extreme outer end of the bracket there may preferably be provided a curved spring 30 to offer a slight resistance to the release of the first supporting pin 20 in order to lessen the danger of accidental falling of the hose from the bracket.

It is obvious that numerous changes may be made in the details set forth without departing from the essentials of the invention as defined in the claims, in which it is my intention to claim all novelty as broadly as possible in view of the prior art.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A hose-rack including, a movable hose-supporting pin, means for normally retaining said pin in hose-supporting position, and a clamping bar pivoted to said pin and cooperating with the pin and a part on the rack to clamp the hose when supported on said pin, said pin being directly actuated by a pull on said hose to release said hose from said pin and to release said pin from said clamping bar.

2. A hose-rack including, a movable hose-supporting pin, means for normally retaining said pin in hose-supporting position, and a clamping bar pivoted to the upper side of said pin and cooperating with the pin and a part on the rack to clamp the hose when supported on said pin, said pin being directly actuated by a pull on said hose to release said hose from said pin and to release said pin from said clamping bar.

3. A hose rack comprising, an arm, a plurality of hose-supporting members thereon for supporting loops of a hose, means for normally retaining said hose-supporting members in hose-supporting position, said hose-supporting members being directly actuated by a pull on said hose to release said hose from said supporting members, and a clamping bar pivoted to one of said members and cooperating with said member and the arm to clamp the hose when supported on said member, said member being directly actuated by a pull on said hose to release said member from said clamping bar.

4. A hose-supporting pin with one end resting on a slanting surface and mounted for swinging movement in both a horizontal and a vertical plane to release a hose supported on said pin, a clamping bar pivoted to said pin, means holding the clamping bar in hose-clamping position with respect to the pin when the pin is in hose-supporting position, said means ceasing to act when the pin is swung to hose-releasing position.

5. A hose-supporting pin with one end resting on a slanting surface and mounted for swinging movement in both a horizontal and a vertical plane to release a hose supported on said pin, a clamping bar pivoted to said pin on the upper side thereof, means holding the clamping bar in hose-clamping position with respect to the pin when the pin is in hose-supporting position, said means ceasing to act when the pin is swung to hose-releasing position.

6. A hose rack comprising an arm, a plurality of hose-supporting members thereon for supporting loops of a hose, said members being mounted for swinging movement in both a horizontal plane and a vertical plane to release said hose, a clamping bar pivoted to one of said hose supporting members, said clamping bar bearing against the under surface of said arm when said supporting member is in said hose-supporting position, and a slanting surface for supporting one end of said hose supporting member whereby said member will be raised when in hose supporting position and said clamping bar will bear against the upper surface of said arm to clamp a fold of the hose between said supporting member and said clamping bar.

7. A hose rack comprising an arm, a plurality of hose supporting members thereon for supporting loops of a hose, said hose-supporting members being directly actuated by a pull on said hose to release said hose from said supporting members, a clamping bar pivoted to one of said hose supporting members and cooperating with said member and the arm to clamp the hose when supported on said member, said member being directly actuated by a pull on said hose to release said member from said clamping bar.

8. A hose rack comprising an arm, a plurality of hose-supporting members thereon for supporting loops of a hose, means for normally retaining said members in hose-supporting position, said members being directly actuated by a pull on said hose to release the hose from said supporting members, a clamping bar pivoted to one of said hose supporting members, said clamping bar bearing against the under surface of said arm when said hose supporting member is in hose-supporting position, and a slanting surface for supporting one end of said hose-supporting member whereby said member will be raised when in hose-supporting position and said clamping bar will bear against the upper surface of said arm to clamp a fold of hose between said supporting member and said clamping bar, said supporting member being directly actuated by a pull on said hose to release the same from said clamping bar.

In testimony whereof I have hereunto set my hand.

EDWARD H. HANSEN.